United States Patent
Bechtel et al.

(10) Patent No.: US 12,502,961 B2
(45) Date of Patent: Dec. 23, 2025

(54) SYSTEM WITH USER INPUT FOR AUTONOMOUS VEHICLE CONTROL

(71) Applicant: FCA US LLC, Auburn Hills, MI (US)

(72) Inventors: Travis D Bechtel, Goodrich, MI (US); Brandon F Brady, Lapeer, MI (US); Johannes Blum, Ruesselsheim (DE)

(73) Assignee: FCA US LLC, Auburn Hills, MI (US)

( * ) Notice: Subject to any disclaimer, the term of this patent is extended or adjusted under 35 U.S.C. 154(b) by 188 days.

(21) Appl. No.: 18/458,259

(22) Filed: Aug. 30, 2023

(65) Prior Publication Data

US 2025/0074189 A1 Mar. 6, 2025

(51) Int. Cl.
| | |
|---|---|
| *B60K 35/00* | (2024.01) |
| *B60K 35/10* | (2024.01) |
| *B60K 35/28* | (2024.01) |
| *B60W 10/18* | (2012.01) |
| *B60W 10/20* | (2006.01) |

(Continued)

(52) U.S. Cl.
CPC ............ *B60K 35/28* (2024.01); *B60K 35/10* (2024.01); *B60W 10/18* (2013.01); *B60W 10/20* (2013.01); *B60W 30/143* (2013.01); *B60W 30/18027* (2013.01); *B60W 40/105* (2013.01); *B60W 50/0097* (2013.01); *B60K 35/29* (2024.01); *B60K 2360/11* (2024.01); *B60K 2360/126* (2024.01); *B60K 2360/164* (2024.01); *B60K 2360/197* (2024.01);
(Continued)

(58) Field of Classification Search
CPC ........ B60K 35/10; B60K 35/00; B60K 35/28; B60K 35/29; B60K 2360/11; B60K 2360/126; B60K 2360/164; B60K 2360/197; B60W 10/18; B60W 10/20; B60W 30/143; B60W 30/18027; B60W 40/105; B60W 50/0097; B60W 2050/0083; B60W 2554/80; B60W 2720/106; B60W 30/12; B60W 30/18163; B60W 50/14
See application file for complete search history.

(56) References Cited

U.S. PATENT DOCUMENTS

| | | | |
|---|---|---|---|
| 11,696,633 B1 * | 7/2023 | Parazynski | A45F 5/00 24/3.2 |
| 2017/0275851 A1 * | 9/2017 | Huber | B60K 35/10 |

(Continued)

OTHER PUBLICATIONS

Logitech; Extreme 3D Joystick; (1 page) https://www.logitechg.com/en-us/products/space/extreme-3d-pro-joystick.963290-0403.html?utm_source=google&srsltid=AfmBOorUx1CgUtWt9ZJvTNmYOFEoo_; Website Accessed Sep. 11, 2023.

(Continued)

*Primary Examiner* — Richard M Camby
(74) *Attorney, Agent, or Firm* — Jeremy J. Klobucar

(57) ABSTRACT

A system for controlling a vehicle includes a steering actuator, a brake actuator a throttle actuator, an interface device and a control system. The interface device has a drive controller coupled to the brake actuator and the throttle actuator, and a steering controller coupled to the steering actuator. The control system is responsive to actuation of the interface device to change one or both of the speed and direction of the vehicle as compared to the instructions executed by the vehicle controller, and the control system is responsive to actuation of the interface device to adjust the instructions as a function of the actuation of the interface device in at least some operating conditions.

20 Claims, 4 Drawing Sheets

(51) Int. Cl.
*B60W 30/14* (2006.01)
*B60W 30/18* (2012.01)
*B60W 40/105* (2012.01)
*B60W 50/00* (2006.01)
*B60K 35/29* (2024.01)

(52) U.S. Cl.
CPC . *B60W 2050/0083* (2013.01); *B60W 2554/80* (2020.02); *B60W 2720/106* (2013.01)

(56) References Cited

U.S. PATENT DOCUMENTS

| | | | |
|---|---|---|---|
| 2018/0208243 A1* | 7/2018 | Kim | B62D 1/28 |
| 2018/0362067 A1* | 12/2018 | Schulz | B62D 1/02 |
| 2021/0200213 A1* | 7/2021 | Gillett | G05D 1/0088 |
| 2021/0206377 A1* | 7/2021 | Mamchuk | G05D 1/0212 |

OTHER PUBLICATIONS

RcMART; WFLY X9 2.4GHZ 9-Channel FHSS Radio Transmitter w/ RG206S RC Receiver; https://www.rcmart.com/wfly-x9-2-4ghz-9-channel-fhss-radio-transmitter-w-rg206s-rc-receiver-x9-0; Website Accessed Sep. 11, 2023.

Canin; Dan; Semper Lightning: F-35 Flight Control System; (1 page) https://www.codeonemagazine.com/article.html?item_id=187; Dec. 9, 2015.

Pride Mobility; Types of Hand Controls on Power Wheelchairs; Feb. 22, 2022 (1 page) https://experience.pridemobility.com/profiles-in-motion/power-wheelchairs/types-of-hand-controls-on-power-wheelchairs/.

* cited by examiner

SYSTEM WITH USER INPUT FOR AUTONOMOUS VEHICLE CONTROL

FIELD

The present disclosure relates to user supplementation or changing of vehicle operating parameters in autonomous vehicle control systems.

BACKGROUND

Vehicles may include various levels of autonomous of ADAS vehicle control of one or more of the steering, throttle and braking, up to and including fully autonomous vehicle operation along a path of travel without human control of the vehicle drive controls. Currently, many drivers are not very comfortable with automated driving systems, and they do not fully trust these systems for many reasons. Some of these reasons include when the vehicle wanders left/right within a lane, drifts toward a second vehicle in an adjacent lane, sometimes as the second vehicle drifts toward the vehicle, the systems require or provide too large or too small a following distance, too slow or fast throttle response and acceleration, late or harsh braking incidents, and the like.

SUMMARY

In at least some implementations, a system for controlling a vehicle includes a steering actuator arranged to permit adjustment of a direction of travel of the vehicle, a brake actuator arranged to permit reduction in a speed of the vehicle and a throttle actuator arranged to permit an increase in a speed of the vehicle. The system also includes an interface device having a drive controller adapted to be movable about a pivot axis relative to a base, the drive controller being coupled to the brake actuator and the throttle actuator, and the interface device having a steering controller carried by the drive controller for movement with the drive controller and rotatable relative to the drive controller about an axis of rotation that is not parallel to the pivot axis, and the steering controller is coupled to the steering actuator. And the system includes a control system connected to the steering actuator, the brake actuator and the throttle actuator wherein the vehicle control system includes a processor and memory that are arranged to execute instructions to control the speed and direction of the vehicle along a path of travel. The control system is responsive to actuation of the interface device to change one or both of the speed and direction of the vehicle as compared to the instructions executed by the vehicle controller, and wherein the control system is responsive to actuation of the interface device to adjust the instructions as a function of the actuation of the interface device in at least some operating conditions.

In at least some implementations, the control system adjusts a steering instruction after a threshold number of actuations of the interface device to change an output of the steering actuator from the output of the steering actuator determined by the control system.

In at least some implementations, the control system adjusts a throttle instruction after a threshold number of actuations of the interface device to change an output of the throttle actuator from the output of the throttle actuator determined by the control system.

In at least some implementations, the control system adjusts a braking instruction after a threshold number of actuations of the interface device to change an output of the braking actuator from the output of the braking actuator determined by the control system.

In at least some implementations, the interface device includes an input that may be actuated to allow use of the interface device to control one or more of the steering actuator, braking actuator and throttle actuator. In at least some implementations, the control system stores to a memory the actuation of the interface device along with a context in which the actuation of the interface device occurred, where the context includes one or more of a number of lanes in a road on which the vehicle is traveling, a speed of the vehicle, a proximity of the vehicle to other vehicles, and a location of the vehicle within a lane in the road along which the vehicle is traveling.

In at least some implementations, the control system selectively deactivates the interface device to prevent actuation of one or more of the steering actuator, the brake actuator and the throttle actuator in a manner that exceeds a threshold for one or more of the steering actuator, the brake actuator and the throttle actuator. In at least some implementations, the threshold is a distance of the vehicle to another vehicle. In at least some implementations, the threshold varies as a function of the speed of the vehicle.

In at least some implementations, the control system controls the steering actuator to position the vehicle within a lane on the road along which the vehicle is traveling and the steering controller is operable to permit the position of the vehicle within the lane to be adjusted by a user. In at least some implementations, the steering instruction is adjusted after multiple actuations of the steering controller of the interface device that occur within a threshold range of vehicle speeds.

In at least some implementations, the system also has a communication interface by which a user can activate a mode in which the controller learns a user's preferences based on control of the vehicle by the user via the interface device. In at least some implementations, the communication interface includes an infotainment system of the vehicle by which multiple menu options can be presented to a user for selection by the user.

In at least some implementations, the control system controls the throttle actuator to provide a predetermined rate of acceleration from a stopped position, and the drive controller is operable to permit the rate of acceleration from a stopped position to be adjusted by a user.

In at least some implementations, a method of controlling a vehicle, includes controlling a speed and a direction of a vehicle with a vehicle control system including one or more electronic controllers, determining a driver actuation of one or more of a steering controller, a braking input or a throttle input and allowing the driver actuation to adjust one or both of the speed and direction of the vehicle, storing in memory said driver actuation and a context in which the driver actuation occurred, and adjusting the manner in which the vehicle control system controls one or both of the speed and the direction of the vehicle as a function of the driver actuation.

In at least some implementations, the manner in which the vehicle control system controls the speed of the vehicle includes a rate of acceleration of the vehicle. In at least some implementations, the method includes enabling a learning mode during which the driver actuation of the steering controller, the braking input or the throttle input are recorded in memory and used by the control system to adjust instructions used by the control system to adjust control in the future of the direction and the speed of the vehicle.

In at least some implementations, the steering controller, the braking input and the throttle input are integrated into an interface device arranged for manipulation by one hand of a user. In at least some implementations, the steering controller and one of the braking input and the throttle input can be manipulated at the same time to permit simultaneous adjustment of both the speed and the direction of the vehicle.

In at least some implementations, controlling the direction of the vehicle includes at least controlling a lateral position of the vehicle within a lane of a road on which the vehicle is traveling and wherein, after repeated driver actuations of the steering controller to change the lateral position of the vehicle within the lane, the vehicle control system changes a setting relating to the lateral position of the vehicle within the lane of the road on which the vehicle is traveling.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
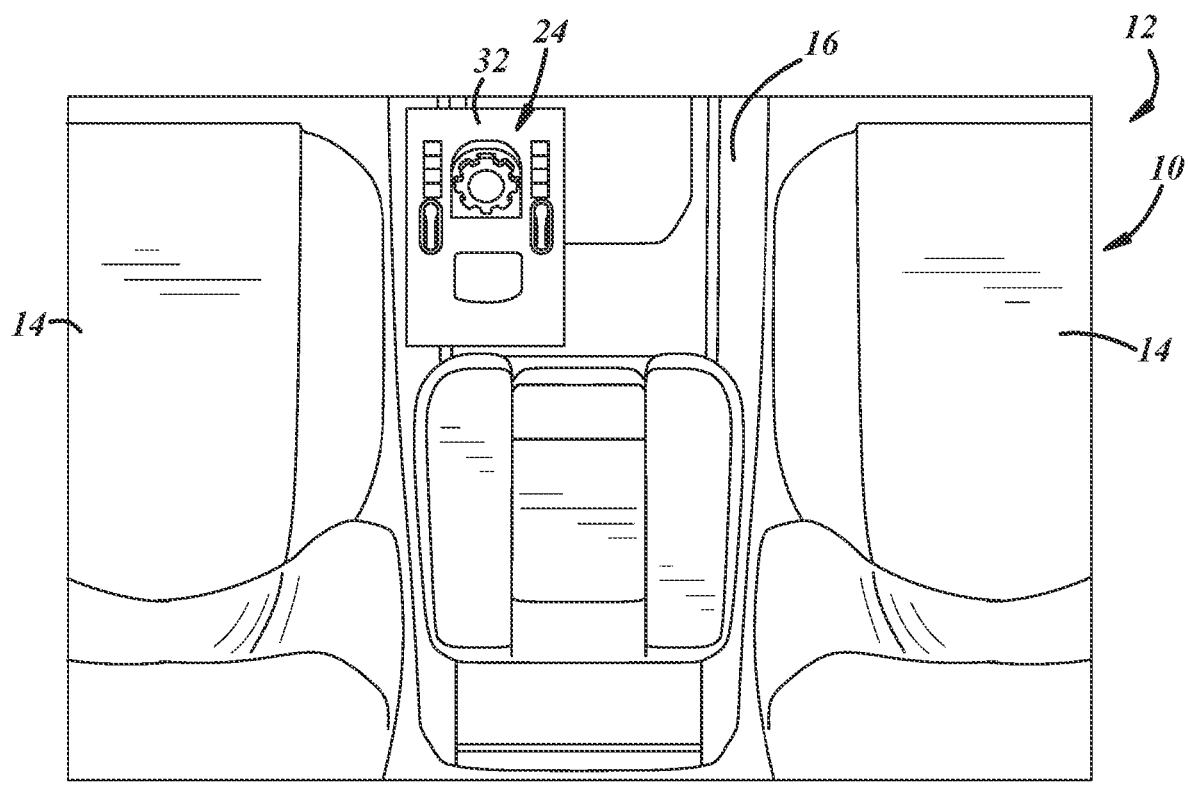
FIG. 1 is a plan view of part of a passenger compartment of a vehicle that includes an interface device.

Referring in more detail to the drawings, FIG. 1 illustrates part of a passenger compartment 10 of a vehicle 12. The passenger compartment 10, as is common, includes seats 14 for passengers and one seat may be designated for a driver or operator of the vehicle 12. A center console 16 may be provided between two seats, and the console 16 may include one or more storage compartments and also inputs or interfaces for various vehicle 12 systems, like heating and cooling systems, audio system, seat adjustment controls, controls that are part of a human-machine interface that permits control of various systems in the vehicle 12 like those mentioned, navigation systems, mobile device interfaces, and the like.

Figure 5:
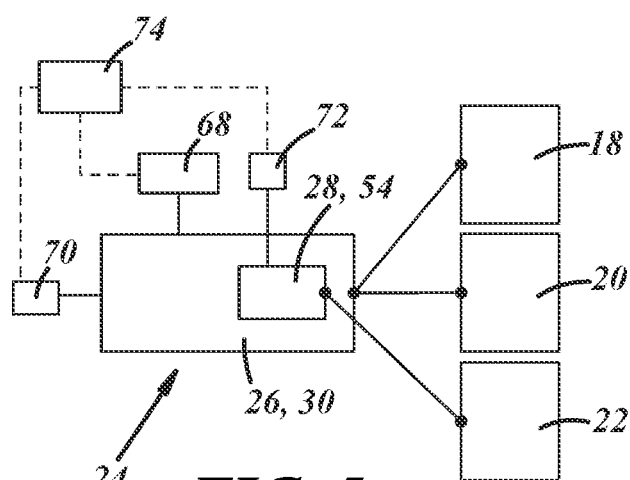
FIG. 5 is a diagrammatic view of a system having an interface device coupled to multiple drive controls.

As shown in FIG. 5, the vehicle 12 includes main drive controls that permit operation of the vehicle 12 along a path of travel. To drive the vehicle 12 along the path, the vehicle 12 includes a prime mover 18 that may include a combustion engine one or more electric motors, or both, coupled to one or more wheels of the vehicle 12 to rotate the wheels. To slow or stop a moving vehicle 12, the vehicle 12 includes a brake system 20 that may include one or more brake assemblies associated with one or more wheels of the vehicle 12. And to permit control of the direction of vehicle travel, the vehicle 12 includes a steering system 22 that is operable to change the steering angle of one or more wheels.

Figures 6, 7:
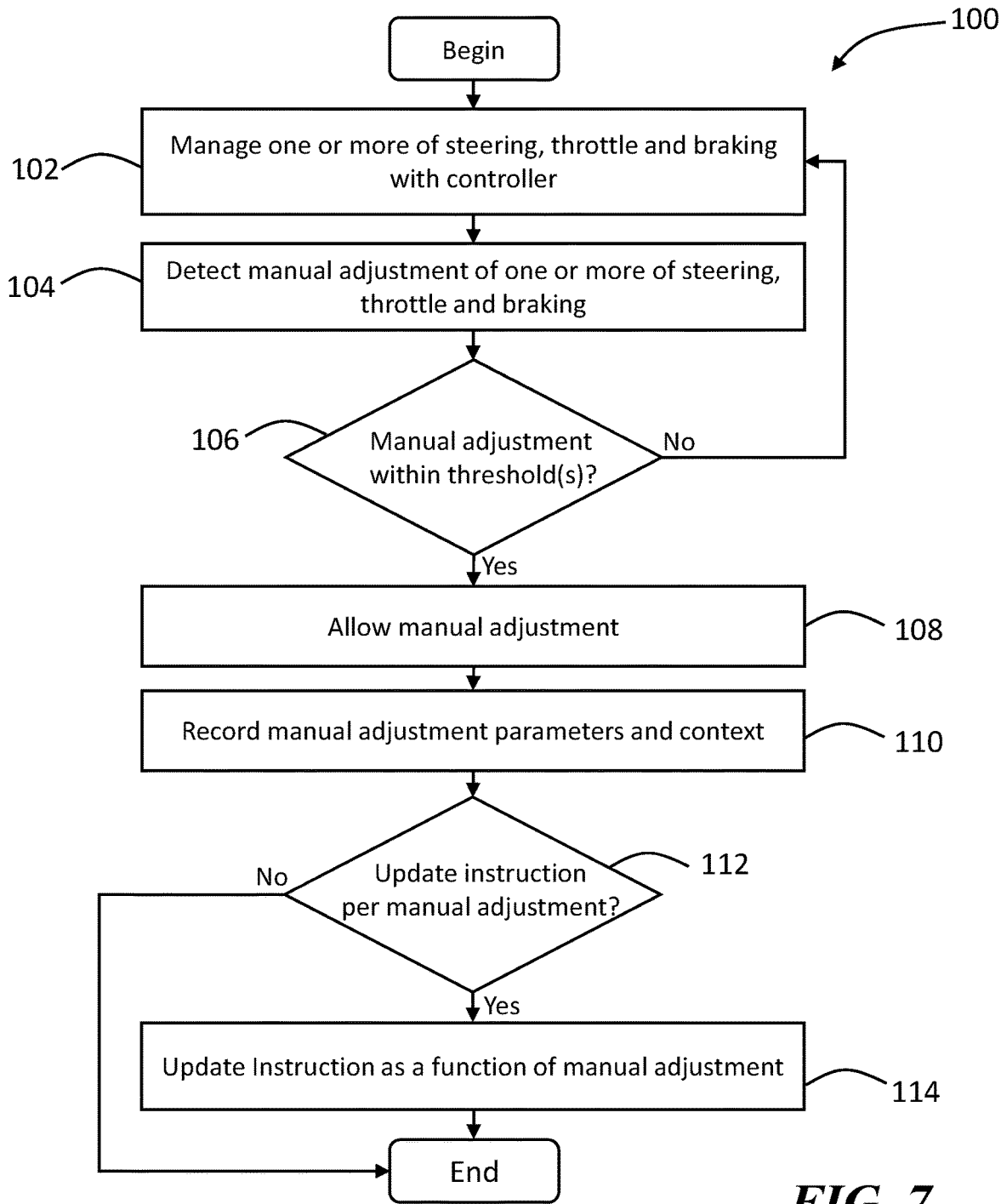
FIG. 6 is a diagrammatic view of an autonomous or Advanced Driver Assistance System and an interface device by which vehicle drive controls can be adjusted.
FIG. 7 is a flowchart of a method of controlling a vehicle.

To permit control of the main drive controls of the vehicle 12, the vehicle 12 includes an interface device 24 having a drive controller 26 and a steering controller 28. The drive controller 26 is coupled to the prime mover 18 and to the brake system 20 (e.g. one or more brake assemblies) to actuate the prime mover 18 and brake system 20 in response to movement of the drive controller 26, and the steering controller 28 is coupled to the steering system 22 to cause a change in steering angle upon movement of the steering controller 28, as set forth in more detail below. The coupling between the interface device 24 and the main drive controls of the vehicle 12 may be accomplished in a so-called "by wire" arrangement, such as drive-by-wire, brake-by-wire and steer-by-wire. In these arrangements, actuators including electric motors may be coupled to the drive controls and actuated in response to inputs provided at the interface device 24, as is generally known. With reference to FIG. 6, the motors/actuators may include a steering actuator 90 associated with the steering system 22, a brake actuator 92 associated with one or more brake assemblies of the brake system 20, and a throttle actuator 94 coupled to an accelerator or throttle controller of the vehicle which actuates the prime mover 18. Thus, direct mechanical connection is not needed between the interface device 24 and the drive controls of the vehicle 12.

In at least some implementations, the drive controller 26 and steering controller 28 are integrated into a single interface device 24 that can be manipulated by a single hand of a user. In the implementation shown in the drawings, with specific reference to FIGS. 2 and 4, the interface device 24 includes the drive controller 26 which has a body 30 that is pivotably connected to a base 32. The base 32 may be a separate component mounted in the vehicle 12, or a surface of the vehicle 12, for example part of a dashboard, console 16, seat or other portion of the vehicle 12. The drive controller body 30 may be cantilevered to the base 32 at a first end 34 and extend away from the base 32 to a second end 36. In at least some implementations, the body 30 is coupled to the base 32 at a pivot 38 for rotation or pivoted movement about a pivot axis 40 that is parallel to an upper surface 42 of the base 32. The body 30 may further have side walls 44 or edges that extend between the first end 34 and the second end 36, a rear face 46 (FIG. 4) arranged facing toward the base 32 and an opposite front face 48 arranged facing outward away from the base 32 and into the passenger compartment 10. The front face 48 may have a portion that is flat or planar and that is arranged parallel to the pivot axis 40. In at least some implementations, the body 30 may be rigid so that it does not bend or flex under the forces needed to pivot the body 30, and the body 30 may be defined in a single piece of material, if desired.

Figure 4:
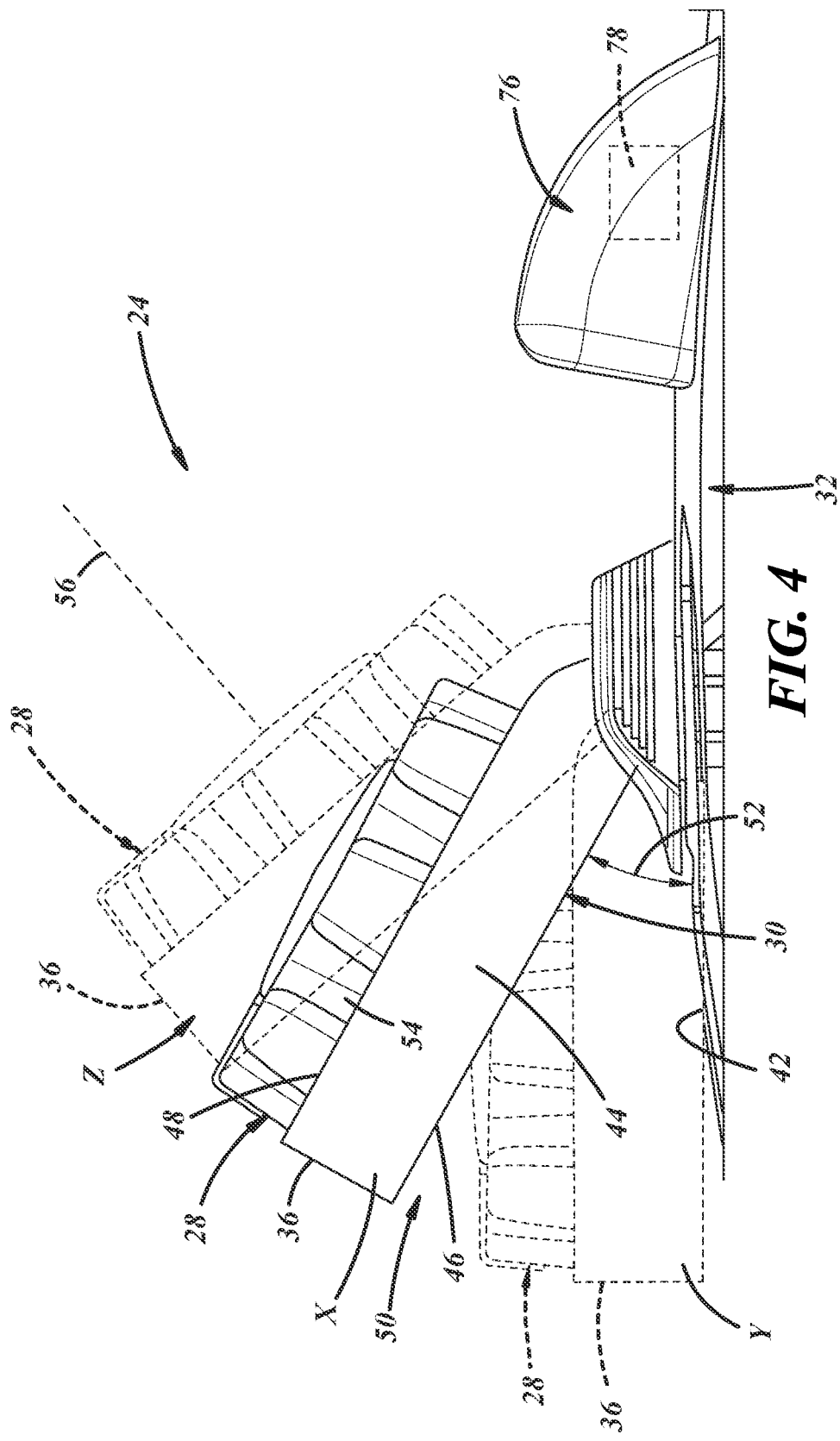
FIG. 4 is a side view of the interface device showing a drive controller body in different positions.

In a first position, the body 30 of the drive controller 26 may be arranged at an non-zero angle to the base 32, with the second end 36 spaced from the base 32 and with a space 50 defined between the rear face 46 and the upper face of the base 32. So arranged, the body 30 can be moved in a first direction, toward the base 32, where the first direction is perpendicular to the pivot axis 40. In at least some implementations, in the first position of the body 30 an included angle 52 (FIG. 4) may be defined between the body 30 (e.g. the rear face 46) and the base 32 (e.g. the upper face) that is between twenty (20) degrees and sixty (60) degrees, and which may be between twenty (20) degrees and forty-five (45) degrees. In at least some implementations, the base 32 is located beneath the body 30 with respect to the direction of gravity, and the first direction is a direction in which the body 30 is pushed downward, toward the base 32 such that the second end 36 of the body 30 moves closer to the base 32 during this movement. Similarly, the body 30 can move about the pivot axis 40 in an opposite, second direction, during which movement the second end 36 of the body 30 moves away from the base 32. Movement of the body 30 is shown in FIG. 4 wherein the position labeled X is a nominal first or home position, the position labeled Y shows the body after it was displaced in the first direction from position X, and the position labeled Z shows the body after it was displaced in the second direction from position X.

In at least some implementations, movement of the drive controller 26 in the first direction actuates the prime mover 18 to rotate the vehicle 12 wheels and move the vehicle 12. This movement may be similar to movement of an accelerator pedal in a vehicle 12. In at least some implementations, movement of the drive controller 26 in the second direction causes a reduction in vehicle acceleration, a slowing of the vehicle speed, and may lead to stopping movement of the vehicle 12. That is, movement of the body 30 in the second direction in a first range, may reduce actuation of the prime mover 18 to cause the prime mover 18 to drive the wheels with less force (e.g. less torque), movement in a second range greater than the first range and which may include the first position of the drive controller body 30 may de-actuate the prime mover 18 to stop the prime mover 18 from actively driving the vehicle 12 wheels or it may actuate a brake assembly to apply a braking force to slow wheel rotation, and continued application of the braking force or de-actuation of the prime mover 18 may cause the vehicle 12 to stop. This movement may be considered to be similar to letting off the accelerator to allow the accelerator to return toward a home or initial position or applying force to a brake pedal to actuate the brake system 20. In this way, movement of the drive controller 26 can be done to control movement of the vehicle 12.

In at least some implementations, the steering controller 28 is mounted to and carried by the drive controller 26. In the example shown, the steering controller 28 includes a body 54 that is connected to the base 32 by a mount or bracket so that the steering controller body 54 extends outwardly from the front face 48 of the drive controller body 30 and is rotatable relative to the mount and the drive controller body 30 about an axis of rotation 56. The axis of rotation 56, in at least some implementations, is perpendicular to the pivot axis 40, and may be perpendicular to the front face 48 of the drive controller body 30. The axis of rotation 56 is spaced from the pivot axis 40 by a distance of between one and four inches (where the distance may be measured in a direction perpendicular to both axes 40, 56), in at least some implementations. In this way, the steering controller 28 moves with the drive controller 26 when the drive controller 26 is moved in the first and second directions as noted above, and the steering controller 28 can be rotated relative to the drive controller 26.

Rotation of the steering controller 28 actuates the steering system to cause a change in the steering angle of the vehicle 12 and hence, a change in the direction of vehicle travel. Rotation of the steering controller 28 in a first direction changes the steering angle in the first direction, and rotation of the steering controller 28 in a second direction, opposite to the first direction, changes the steering angle in the second direction. In the example shown, the steering controller 28 is rotated counterclockwise to steer the vehicle 12 left, and the steering controller 28 is rotated clockwise to steer the vehicle 12 to the right. In at least some implementations, the steering controller 28 may be rotated relative to the drive controller 26 in any position of the drive controller 26. That is, steering changes can be made while the vehicle 12 is accelerating, traveling at a constant speed or braking.

The steering controller body 54 may include recesses 58 to facilitate grasping of the body by a user, and to reduce slippage of a user's hand from the steering controller 28. The recesses 58 may include surfaces at a variable distance from the rotational axis 56, as well as undercuts designed to facilitate application of a pulling force to the steering controller body 54 and/or the drive controller body 30. In this regard, the undercut may be defined by a flange or surface 60 of or on the steering controller body 54 that extends farther from the axis of rotation 56 and which axially overlies a surface 62 located closer to the axis of rotation 56 and also closer to the front face 48 of the drive controller body 30. In some implementations, a user may apply a pulling or pushing force to one or both of the drive controller body 30 and steering controller body 54, as desired. Instead of or in addition to the undercut on the steering controller body 54, undercut pockets or recesses 61 may be provided on the body 30, and may be formed in one or both sidewalls 44, such as is shown in dashed lines in FIG. 3. Here, dashed lines are used because the recess(es) 61 may be formed below the front face 48 of body 30 and in such a construction, would not be directly viewable in FIG. 3. The recesses 61 may receive a thumb and finger of a user to provide a more secure grip on the body 30 for control of vehicle speed.

In use, a user may grasp the steering controller body 54 and by pushing or pulling on the steering controller 28, in a direction generally perpendicular to the axis of rotation 56, may move the drive controller body 30 about the pivot 38. That is, the force needed to move the drive controller body 30 may be applied to the steering controller 28 without a user directly touching/engaging the drive controller body 30. In this way, a single hand of the user may easily move the drive controller body 30 and rotate the steering controller body 54. Further, the vehicle 12 may be steered while actuating the prime mover 18 or brake system 20 by a compound motion involving pushing or pulling on the steering controller 28 to move the driver controller while rotating the steering controller 28.

Figure 2:
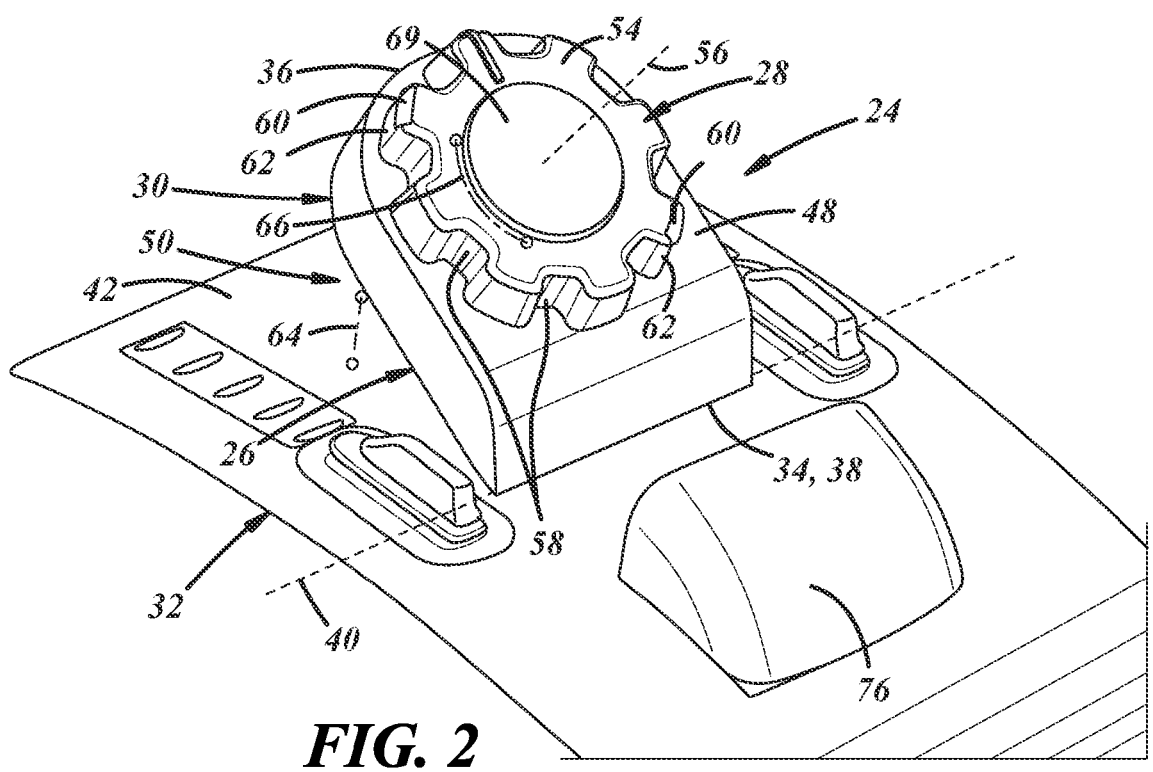
FIG. 2 is a perspective view of the interface device.

To facilitate use of the interface device 24, the device may return to the first position (which may be called a home position), shown in FIG. 2, absent force on the device. For example, the drive controller body 30 may be biased to the first position so that if pushed toward the base 32 and thereafter released, the drive controller body 30 will return to the first position, or if pulled away from the base 32 from the first position, to actuate the brake system 20, the drive controller body 30 will return back to the first position under spring force. In an electric vehicle 12, regenerative braking may also be enabled via movement of the interface device 24, similar to such operation with a vehicle 12 including foot pedals.

Similarly, the steering controller 28 may be biased to its first position, which may be a neutral or centered position, which may relate to a zero steering angle that permits straight travel of the vehicle 12. Thus, if the steering controller 28 is rotated in either direction and then released, the steering controller 28 will return under the biasing force back to the first or neutral position of the steering controller 28. The biasing forces on both bodies may be provided by suitably arranged springs 64, 66, shown diagrammatically in FIG. 2, where one or more springs may act on each body 30, 54.

Further improvements may be provided, as desired. For example, when a reverse gear is selected to permit reverse movement of the vehicle 12, the system can be arranged so that moving the drive controller body 30 in the second direction about the pivot axis 40, e.g. away from the base 32, may actuate the prime mover 18 to drive the vehicle 12 in a reverse direction. Steering while moving in the reverse direction can be accomplished by rotating the steering controller body 54 as described already. Thus, instead of actuating the brake system 20 by such movement of the drive controller body 30, the system may recognize the selection of reverse gear and function accordingly. In some implementations, a reverse or other drive gear may be selected by a pattern of movement of the interface controller. By way of non-limiting examples, moving the drive controller body 30 in the second direction twice (e.g. pulling back on the body twice) in succession and within a certain time period may cause the vehicle 12 to shift or permit reverse vehicle travel. Similarly, two or more pushes of the drive controller body 30 toward the base 32 may indicate a desire for forward travel and may cause the vehicle 12 to shift into a forward drive gear or permit forward driving.

Further, to avoid the need to hold the drive controller body 30 in a particular position, an actuator 68 (FIG. 5), which may be electrically driven and controlled, may be coupled to the drive controller body 30 and be operational to hold the drive controller body 30 in a particular angle relative to the base 32 (i.e. rotational position about the pivot 38). This may maintain a vehicle speed, as desired.

Of course, cruise control devices and the like may be used to permit a speed to be retained without need for the drive controller body 30 to remain in a rotated position. That is, after setting a desired speed, a control system may operate the prime mover 18 to achieve and maintain the speed without requiring the drive controller 26 to be rotated from its first position, or permitting the drive controller body 30 to return to the first position while maintaining a desired speed (where the desired speed may include a desired following distance from a vehicle 12 ahead, without regard to a specific speed in a so-called adapted cruise control system). Still further, the vehicle 12 could be capable of at least somewhat autonomous driving, where the interface device 24 is needed only when a driver wishes to command the vehicle 12 drive controls directly, or otherwise.

In at least some implementations, an input 69 is carried by the steering controller body 54 and is movable relative to the steering controller 28 to change the state of a switch. The input 69 could, for example, control actuation of cruise control or other vehicle setting, like putting the vehicle into a park gear or setting, or otherwise changing the vehicle drive gear or setting. In the example shown, the input is a push button that is movable axially relative to the axis of rotation 56 of the steering controller 28.

Figure 3:
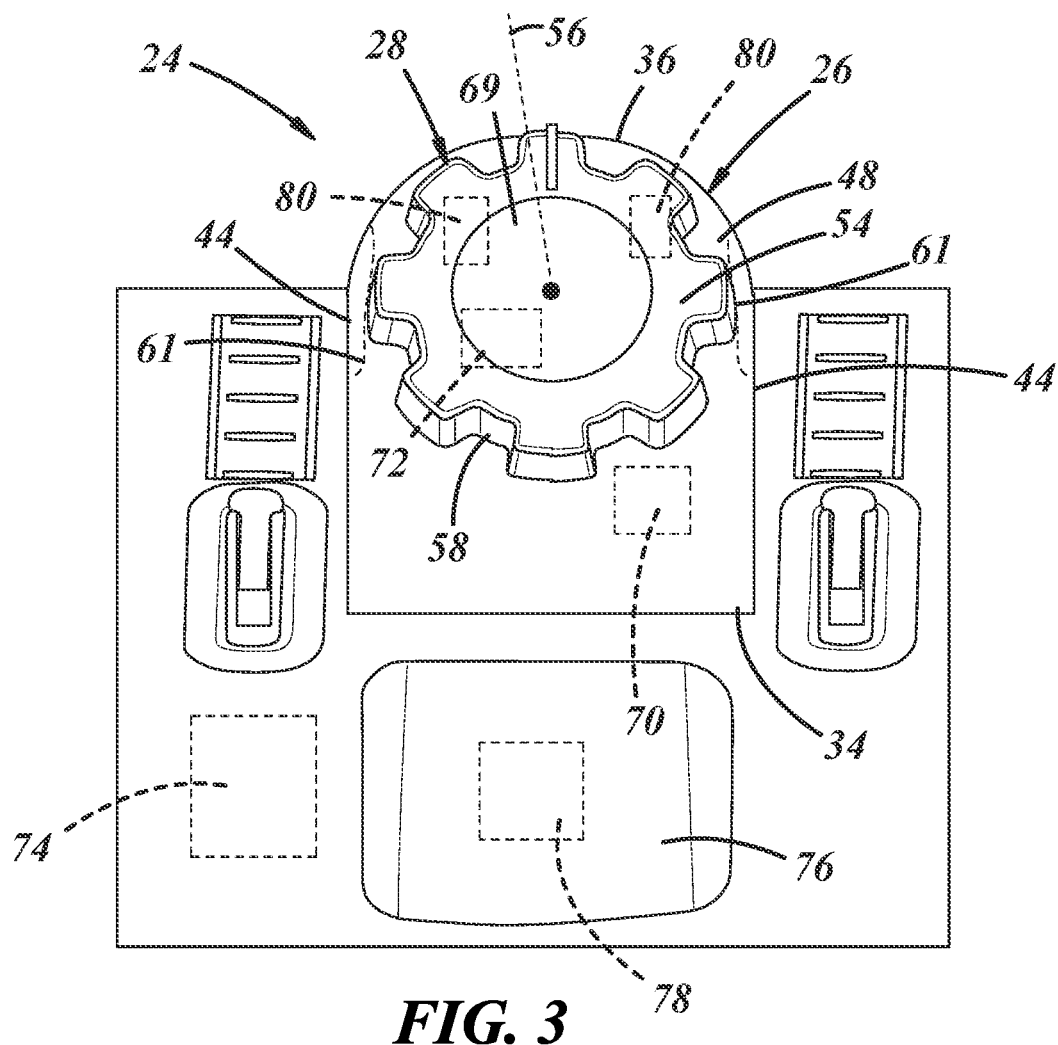
FIG. 3 is a front view of the interface device.

As shown in FIGS. 3 and 5, suitable sensors 70, 72 and one or more microcontrollers 74 may be used to sense the position of the drive controller body 30 and the steering controller body 54, with such positions relayed to appropriate control devices to cause a desired action, as noted herein. Further, force feedback may be provided, such as by a servo actuator, to improve the feel of the interface device 24 and to provide feedback to a user.

Further, a wrist rest 76 may be provided on the base 32 or otherwise adjacent to the interface device 24. The wrist rest 76 may provide stability to a user's arm to reduce fatigue and improve accuracy of the intended movements of the interface device 24. A sensor 78 may be provided in or near the wrist rest 76 that is responsive to the presence of a user's arm/wrist on the wrist rest 76, and this presence may unlock or enable control of the vehicle 12 via the interface device 24. This may prevent unintended or inadvertent actuation of the interface device 24 to avoid unintended commands to the vehicle 12 drive controls. In at least some implementations, presence of a user's arm on the wrist rest 76 may be required to permit a vehicle 12 to be shifted out of a park gear or setting. Similarly, as shown in FIG. 3, one or more sensors 80 may be provided on the interface device 24 (e.g. on the steering controller body 54) to detect the presence of a user's hand in predetermined locations on the device, which indicates the user intends to control the device and is not merely resting their hand or arm on the device.

The presence sensors 78, 80 may be used in several ways. For example, to permit shifting a vehicle 12 out of park, or other operation of the interface device 24, a system may be arranged so that presence of a user's arm on the wrist rest 76 and presence of a user's hand on the interface device 24 need to be determined before operation of the interface device 24 is permitted or before such operation causes a corresponding action with respect to the vehicle 12 drive controls. That is, the interface device 24 could include a lock to prevent movement of the device 24 until unlocked, or movement of the device without detection of the presence of a user's arm and/or hand could be ignored by the system such that no drive control commands are issued.

Certain other vehicle 12 controls may be located on or near the interface device 24, like a transmission or other gear selector by which the vehicle 12 may be placed into park, reverse of forward drive gear. In this way, further one-handed control of the vehicle 12 is possible.

While noted as being mounted in a vehicle 12 console 16 for use by a driver of the vehicle 12, the interface device 24 may be used in many different applications, and installed in different locations. The interface device 24 may be mounted to a movable carrier to permit movement of the device for use in different locations within a vehicle 12 or other application, such as to permit use by either hand of a user, and/or by a user who is standing or sitting. The interface device 24 may be storable out of sight for autonomous driving or driving via other controls such as a traditional steering wheel and pedals, and deployable for use as desired.

By way of non-limiting examples, the interface device 24 could be used in any vehicle 12, including cars, trucks, busses, hi-lo/forklift, skid steer, electric pallet jack, and others. And the interface device 24 can be used as an input for a video game system or as a computer mouse, or as a controller for a drone, or the like.

The interface device 24 could enable a vehicle 12 to not have a steering wheel or similar steering device, or acceleration and brake pedals, or the structures which mount these devices in the vehicle 12, saving space and weight for the vehicle 12. A gear shifter might also not be needed whereby gears are selected via the interface device 24.

Vehicles may include various levels of autonomous of ADAS vehicle control of one or more of the steering, throttle and braking, up to and including fully autonomous vehicle operation by an electronic control system 98 resulting in the vehicle traveling along a path of travel without human control of the vehicle drive controls. In autonomous vehicle systems, user actuated vehicle controls, like the interface device 24 described above, can be used to provide steering, throttle and braking inputs that may be applied in addition and supplemental to, the inputs directed by the autonomous driving control system(s) 98. While the interface device 24 described above enables one-handed or integrated control of each of steering, throttle and braking inputs/actuators 90, 92, 94, other vehicle controls may be used wherein these inputs are integrated or separate. For example, a traditional steering wheel, and brake and throttle pedals could be used to supplement the autonomous vehicle control.

In at least some implementations, the vehicle includes autonomous driving control system 98 that provides inputs to the vehicle actuators 90, 92, 94, such as electric motors, to change a steering angle, throttle level or braking level according to various predetermined criteria and thresholds. The control system 98 may include one or more processors 99 and memory 101 having instructions executed by the processor(s) 99 to actuate the vehicle drive controls. The criteria and thresholds may be included in the instructions and may vary as a function of the magnitude of inputs needed for safety first, and then for comfort and to meet occupant expectations in normal driving. For example, inputs, such as those needed to avoid a collision like rapid braking, steering angle change, etc) may be permitted or instituted at a higher magnitude than those inputs for normal driving situations.

In at least some implementations, user supplemental inputs are permitted only if greater than and not less than the control system instructions for the input(s) during a safety maneuver or maneuvers. For example, a user could be permitted to actuate a brake input to stop the vehicle faster than would be done by the autonomous system by itself, but a user would not be permitted to reduce braking if an accident might result from such reduced braking.

In normal driving situations, however, it may be desirable to allow a user to supplement the control system inputs to achieve vehicle control characteristics that are more preferable to the driver or vehicle occupant. Such supplemental inputs provided by a user may be constrained within predetermined limits, as desired. For example, the control system 98 may have certain thresholds or ranges of accepted values for acceleration, braking, and rate of steering angle change. The control system 98 may have additional thresholds for different vehicle operational parameters, and in different contexts or environments. Such thresholds may include, but are not limited to, following distance from a vehicle ahead of the vehicle, lateral position of a vehicle within a lane (e.g. left/right position within a road lane), lateral distance from vehicles in adjacent lanes, lateral distance from adjacent objects like construction barriers or barrel or signs, rate of vehicle travel around turns of various severity, rate of change of steering angle while changing lanes on a road, preferred lane of travel on multi-lane roads of varying numbers of lanes, preferences when driving near or to highway on-ramps and off-ramps, and the like.

When a user provides input, the control system 98 may determine the rate, rate of change and duration of acceleration and deceleration events, delta velocity and longitudinal proximity to other vehicles/objects during the maneuver performed by the user. The control system may determine the rate, rate of change and duration of steering inputs and positional proximity to vehicles/objects laterally during the maneuver performed by the user. And the control system may determine the context/environment in which the maneuvers were made, as noted elsewhere in this disclosure.

In at least some implementations, when not contrary to a vehicle safety maneuver, a user may actuate one or more of the steering input, throttle input or braking input (e.g. the drive controller 26 and/or steering controller 28) to provide a vehicle response and/or control during driving that is different than the system inputs. Users may provide such inputs as often as desired during vehicle operation, and when such inputs are not provided, the system may return to the predetermined instructions with regard to system inputs and control the vehicle accordingly.

Further, the control system 98 may instead learn the user's desired inputs or instructions for various vehicle control parameters, and the control system may update the predetermined instructions with regard to one or more system inputs (e.g. a steering instruction, a throttle instruction or a braking instruction) to match or as a function of the user's supplemental inputs. Such learning may occur by prompting the user to confirm a desire to change a system instruction for an input after a user supplemental input is detected by the control system. In at least some implementations, a prompt may be accomplished or provided by a communication interface, such as an infotainment system having a software interface that provides text options on a vehicle display screen or by audio prompt over a vehicle audio system to which a user may verbally respond. Additionally or instead, a user may enact a learning mode for the vehicle control system 98 and thereafter user inputs may be detected and stored by the vehicle control system.

Additionally or instead, the control system 98 may react and change a predetermined system input when a user has modified a vehicle control more than a threshold for such supplemental input. This may be done with Artificial Intelligence (AI) and/or machine learning techniques where the system associates user inputs with the driving situation or situations in which they occur and when a sufficient trend is detected, the control system adjusts to accommodate the driver input preference(s). The threshold may be a certain number of times that a supplemental input is provided when a particular driving situation has occurred, a certain percentage of time the supplemental input is provided during a particular driving situation, or the like, as desired. For example, the steering instruction is adjusted in at least some implementations after at multiple actuations of the steering controller of the interface device, and the actuations may need to occur within a threshold range of vehicle speeds to ensure that the actuations are for similar driving situations. Similar control schemes can be implemented for braking and throttle controls, as desired. A driving situation can refer to a given vehicle control situation that occurs with some frequency, like acceleration from a full stop, following distance when traveling within a certain speed range, deceleration before negotiating a turn, position of the vehicle within a lane when traveling at a certain speed, negotiating a turn of a certain angle, driving next to another vehicle or a barrier/object, and the like.

The control system inputs for driving situations can change based on vehicle speed and the context of the driving situation or vehicle environment, such as whether the vehicle is within a crowded area (e.g. in heavy traffic), the height of a vehicle ahead (for example, greater following distance may be provided when a tall vehicle is ahead and restricting forward view), on a narrow road, on a highway, whether crossing roads/intersections exist, whether the vehicle is executing a maneuver or simply traveling along at a set speed, presence of other vehicles or things, type of driving surface (paved road, gravel, sand, wet or icy road conditions, etc), among other factors. Further relevant factors that may be determined include whether the driver is using a phone or vehicle system (e.g. navigation or infotainment system 103 (FIG. 6)) and maybe partially distracted, seated posture and perceived drowsiness of the driver (which may be determined by in-vehicle cameras), or whether the driver is in a conversation with another occupant of the vehicle as may be determined from an in-vehicle microphone. Further, the driving situation may include environmental factors like time of day (e.g. due to visibility differences between daytime and nighttime), whether the vehicle is traveling into the sun, and the like.

Accordingly, in at least some implementations, the driver can influence and adjust the instructions implemented by the control system 98 with regard to inputs and set points of an autonomous or assisted driving system without the need to transfer full vehicle control from the control system 98 to the human driver. The characteristics or preferences of different drivers or vehicle occupants can be separately learned to permit customized vehicle control that is adapted for different individuals. The user inputs can be provided on top of, e.g. in addition to, the control system inputs and while the vehicle is moving, rather than simply setting control system defaults via a software interface.

Software interfaces typically provide a limited range of preconfigured menu options, like 3 options for following distance (near, average, far), or acceleration (slower, average, faster), and the like. Further, these limited options might be used in all relevant driving situations because trying to get users to provide feedback for all driving situations while the vehicle is not moving would be overwhelming to the user, and many users would not be comfortable or confident in selecting parameters for a wide range of driving conditions as they might not understand the effect of their choices on vehicle dynamics which can lead to a long period of trial and error improvements in the vehicle settings. However, some drivers may prefer different thresholds in different driving situations, and more control over the vehicle dynamics in general.

As disclosed herein, user inputs provided as the vehicle is moving can be associated with specific driving situations and maneuvers and can permit more customization and user control in a manner that is directly controlled by the driver in a real-world interaction, where a given driver input leads to a result understood by the driver, so the driver has confidence in the input provided. The driver inputs or manual adjustments can be made in the real-world use of the vehicle, and in specific situations, and so are intuitively made by a user and can be made in an unlimited number of situations. That is, the system learns from actual driver input of the actual vehicle inputs (steering, throttle and brake). This is easier for an operator to understand and control, and more accurate than forcing a user to select among menu options presented while the vehicle is not moving and guess at the relative levels of adjustment being made via the presented menu options.

The interface device 24 can be deactivated during autonomous driving, and may be activated when a user provides an input and/or when a user initiates an operation to ready the system to detect subsequent user input. For example, the vehicle may include a button or other input, which may be carried on or near the interface device 24, that the user may actuate to cause the control system to be responsive to subsequent user inputs of steering, acceleration or braking, as well as the context in which such input occurs (e.g. on a city street, highway, relative following distance to other vehicles, position in lane, position relative to other objects, and the like).

Additionally or instead, the control system may prompt a user to provide an input before an upcoming driving situation or maneuver, during a driving situation or maneuver, or after a driving situation or maneuver has occurred as a way to train a system to the preferences of a new driver/operator. In this way, the user can set or adjust a system response/dynamic with regard to a specific driving situation or maneuver.

In at least some implementations, the control system may present a user with three operating modes including full manual driving, highly automated driving, or directed automated driving. In the full manual driving mode, and in normal driving situations, a driver is in control of the vehicle inputs (steering, throttle and brake) with or without vehicle control or safety features like anti-lock braking, traction control, stability control and the like. In the highly automated driving mode, the vehicle control system is fully or mostly autonomously driven, at least within designated regions or areas. In the directed automated driving mode, the vehicle may have the same control as in the highly automated driving mode but a user can prompt and suggest/direct a near term action for the vehicle to execute within autonomous operation parameters, as noted herein. For example, a user may use the interface device or other vehicle input(s) to control a lane change, when the control system determines that a lane change may be done safely in view of the environment in which the car is situated (proximity to and relative speed of other vehicles and objects, the current vehicle speed, road conditions and the like). The vehicle may include outputs, like lights or other visual indicator or display, or audio output, or both, that indicate to the user the current driving mode so there is clarity regarding whether the user or the vehicle is primarily responsible for operation of the vehicle. The control system may also provide an output/indication to the user during a user input/adjustment so that the user knows that the system recognizes that the user is providing the input/adjustment.

Further, information relating to the adjustments made in different vehicles can be communicated with a central system that is in communication with multiple vehicles. The central system can aggregate the information received from the multiple vehicles regarding user implemented adjustments to the instructions implemented by the control system 98 of each vehicle, and, when a threshold for user adjustments by different users is detected or determined, the central system can adjust the predetermined parameters in other vehicles as a function of the information received from vehicles in use.

In accordance with this disclosure, FIG. 7 illustrates a method 100 of operating a vehicle. In step 102, the vehicle drive controls including one or more of steering, throttle and braking, are managed by a vehicle controller or control system 98 in a full or partially autonomous control scheme. During such operating scheme, the control system is operable to detect, in step 104, manual adjustment of the interface device 24 to adjust one or more of the steering, throttle and braking of the vehicle. In step 106, the detected manual adjustment is checked against one or more thresholds to determine if the desired adjustment is within control parameters of the vehicle, for example, to ensure the adjustment does not unduly decrease the safety of travel (e.g. result in too little following distance for the vehicle speed, or interfere with another vehicle on the road). If the detected adjustment are not within the threshold(s), then the method returns to step 102 and the adjustments are not made.

If the detected adjustment is within the threshold(s), then the method continues to step 108 and the adjustments are made. In step 110, the adjustments may be recorded both with regard to the parameters of the adjustment and the context in which the adjustment was made. The parameters may include the rate of change, the starting and ending operating conditions (e.g. steering angles, speeds, etc), the duration of the adjustment, and the like. The context may include the driving situation and environment, as described herein.

Next, the method in step 112 may check to see if the manual adjustment should result in an update to one or more instructions relating to the control of the vehicle, so that the controller operates the vehicle with the updated instruction(s) rather than the prior instruction(s). This decision may be made based on, by way of examples without limitation, the frequency of the manual adjustment, percentage of occurrences for a given driving situation and/or context, the magnitude of the adjustment desired by the driver, whether the driver has specifically requested that the instruction(s) be updated such as may occur through a software interface by which the driver or control system can institute/initiate a learning mode or instruction change, and the like. If the instruction(s) should be updated, then in step 114, the instruction(s) are updated and, if not, the method may end.

Currently, many drivers are not fully comfortable with automated driving systems, and they do not fully trust these systems for many reasons. Some of these reasons include when the vehicle wanders left/right within a lane, drifts toward a second vehicle in an adjacent lane as the second vehicle drifts toward the vehicle, too large or too small a following distance, too slow or fast throttle response and acceleration, late or harsh braking incidents, and the like. Allowing a user to fine-tune or adjust vehicle response during automated driving maneuvers can increase user trust and satisfaction with automated driving modes and features by changing the automated driving response to more closely match the user's own manual driving habits and preferences.

While traditional vehicle inputs including a steering wheel and throttle and brake pedals can be used to provide manual user driving inputs to the control system, the interface device 24 may have some advantages. Among the advantages are that the steering, throttle and brake inputs can be integrated and easily maneuvered by a user, for example by a single hand of a user, the interface device 24 can be stowed when not in use and deployed or made available when use is desired, the system may be able to override the inputs in incidents wherein automated control of the vehicle is needed or when the control system determines that the driver's inputs may result in unsafe or risky driving situations, and the like.

What is claimed is:

1. A system for controlling a vehicle, comprising:
   a steering actuator arranged to permit adjustment of a direction of travel of the vehicle;
   a brake actuator arranged to permit reduction in a speed of the vehicle;
   a throttle actuator arranged to permit an increase in a speed of the vehicle;
   an interface device having a drive controller adapted to be movable about a pivot axis relative to a base, the drive controller being coupled to the brake actuator and the throttle actuator, and the interface device having a steering controller carried by the drive controller for movement with the drive controller and rotatable relative to the drive controller about an axis of rotation that is not parallel to the pivot axis, and the steering controller is coupled to the steering actuator; and
   a control system connected to the steering actuator, the brake actuator and the throttle actuator wherein the control system includes a processor and memory that are arranged to execute instructions to control the speed and direction of the vehicle along a path of travel, and the control system is responsive to actuation of the interface device to change one or both of the speed and direction of the vehicle as compared to the instructions executed by the control system, and wherein the control system is responsive to actuation of the interface device to adjust the instructions as a function of the actuation of the interface device in at least some operating conditions.

2. The system of claim 1 wherein the control system adjusts a steering instruction after a threshold number of actuations of the interface device to change an output of the steering actuator from the output of the steering actuator determined by the control system.

3. The system of claim 1 wherein the control system adjusts a throttle instruction after a threshold number of actuations of the interface device to change an output of the throttle actuator from the output of the throttle actuator determined by the control system.

4. The system of claim 1 wherein the control system adjusts a braking instruction after a threshold number of actuations of the interface device to change an output of the braking actuator from the output of the braking actuator determined by the control system.

5. The system of claim 1 wherein the interface device includes an input that may be actuated to allow use of the interface device to control one or more of the steering actuator, braking actuator and throttle actuator.

6. The system of claim 5 wherein the processor stores to the memory the actuation of the interface device along with a context in which the actuation of the interface device occurred, where the context includes one or more of a number of lanes in a road on which the vehicle is traveling, a speed of the vehicle, a proximity of the vehicle to other vehicles, and a location of the vehicle within a lane in the road along which the vehicle is traveling.

7. The system of claim 1 wherein the control system selectively deactivates the interface device to prevent actuation of one or more of the steering actuator, the brake actuator and the throttle actuator in a manner that exceeds a threshold for one or more of the steering actuator, the brake actuator and the throttle actuator.

8. The system of claim 7 wherein the threshold is a distance of the vehicle to another vehicle.

9. The system of claim 7 wherein the threshold varies as a function of the speed of the vehicle.

10. The system of claim 2 wherein the control system controls the steering actuator to position the vehicle within a lane on the road along which the vehicle is traveling and the steering controller is operable to permit the position of the vehicle within the lane to be adjusted by a user.

11. The system of claim 10 wherein the steering instruction is adjusted after at multiple actuations of the steering controller of the interface device that occur within a threshold range of vehicle speeds.

12. The system of claim 1 which also comprises a communication interface by which a user can activate a mode in which the control system learns a user's preferences based on control of the vehicle by the user via the interface device.

13. The system of claim 12 wherein the communication interface includes an infotainment system of the vehicle by which multiple menu options can be presented to a user for selection by the user.

14. The system of claim 1 wherein the control system controls the throttle actuator to provide a predetermined rate of acceleration from a stopped position, and the drive controller is operable to permit the rate of acceleration from a stopped position to be adjusted by a user.

15. A method of controlling a vehicle, including:
- controlling a speed and a direction of a vehicle with a vehicle control system including one or more electronic controllers;
- determining a driver actuation of one or more of a steering controller and a drive controller having one or both of a braking input and a throttle input and allowing the driver actuation to adjust one or both of the speed and direction of the vehicle;
- storing in memory said driver actuation and a context in which the driver actuation occurred; and
- adjusting the manner in which the vehicle control system thereafter controls, independent of a driver actuation of the steering controller or the drive controller, one or both of the speed and the direction of the vehicle as a function of the driver actuation and the context in which the driver actuation occurred that is stored in the memory.

16. The method of claim 15 wherein the manner in which the vehicle control system controls the speed of the vehicle includes a rate of acceleration of the vehicle, and the rate of acceleration implemented by the control system is different after the step of adjusting than before the step of adjusting.

17. The method of claim 15 which includes enabling a learning mode during which the driver actuation of the steering controller, the braking input or the throttle input are recorded in memory and used by the control system to adjust instructions used by the control system to adjust control in the future of the direction and the speed of the vehicle, where the control system controls the direction and the speed of the vehicle without driver actuation of the steering controller or the drive controller.

18. The method of claim 15 wherein the steering controller, the braking input and the throttle input are integrated into an interface device arranged for manipulation by one hand of a user.

19. The method of claim 18 wherein the steering controller and one of the braking input and the throttle input can be manipulated at the same time to permit simultaneous adjustment of both the speed and the direction of the vehicle.

20. A method of controlling a vehicle, including:
- controlling a speed and a direction of a vehicle with a vehicle control system including one or more electronic controllers;
- determining a driver actuation of one or more of a steering controller and a drive controller having one or both of a braking input and a throttle input and allowing the driver actuation to adjust one or both of the speed and direction of the vehicle;
- storing in memory said driver actuation and a context in which the driver actuation occurred; and
- adjusting the manner in which the vehicle control system controls one or both of the speed and the direction of the vehicle as a function of the driver actuation, wherein controlling the direction of the vehicle includes at least controlling a lateral position of the vehicle within a lane of a road on which the vehicle is traveling and wherein, after repeated driver actuations of the steering controller to change the lateral position of the vehicle within the lane, the vehicle control system changes a setting relating to the lateral position of the vehicle within the lane of the road on which the vehicle is traveling.

\* \* \* \* \*